US012739288B2

(12) United States Patent
Selznick et al.

(10) Patent No.: US 12,739,288 B2
(45) Date of Patent: Sep. 15, 2026

(54) INTEGRATED TELECOMMUNICATIONS NETWORK TRANSCRIPTION SYSTEMS AND METHODS

(71) Applicant: T-Mobile USA, Inc., Bellevue, WA (US)

(72) Inventors: Dennis A. Selznick, Overland Park, KS (US); Stephen Dekat, Olathe, KS (US); Deepak Jaiswal, Redmond, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 213 days.

(21) Appl. No.: 18/649,926

(22) Filed: Apr. 29, 2024

(65) Prior Publication Data

US 2025/0337797 A1 Oct. 30, 2025

(51) Int. Cl.

| | |
|---|---|
| ***G10L 15/26*** | (2006.01) |
| ***H04L 65/1089*** | (2022.01) |
| ***H04L 65/1096*** | (2022.01) |
| ***H04M 3/42*** | (2006.01) |
| ***H04W 12/02*** | (2009.01) |

(52) U.S. Cl.

CPC ...... *H04L 65/1096* (2013.01); *H04L 65/1089* (2013.01); *H04M 3/42391* (2013.01); *H04W 12/02* (2013.01); *G10L 15/26* (2013.01); *H04M 2201/42* (2013.01)

(58) Field of Classification Search

None

See application file for complete search history.

(56) References Cited

U.S. PATENT DOCUMENTS

| | | | |
|---|---|---|---|
| 6,757,732 | B1 | 6/2004 | Sollee et al. |
| 7,421,477 | B2 | 9/2008 | Pettinato |
| 7,474,741 | B2 | 1/2009 | Brunson et al. |
| 7,844,684 | B2 | 11/2010 | Pettinato |
| 7,995,589 | B2 | 8/2011 | Sollee et al. |
| 8,266,313 | B2 | 9/2012 | Pettinato |
| 8,407,048 | B2 | 3/2013 | Rogers |
| 8,407,052 | B2 | 3/2013 | Hager |

(Continued)

FOREIGN PATENT DOCUMENTS

| | | | |
|---|---|---|---|
| CN | 101449561 | B | 7/2012 |
| DE | 102013101817 | B4 | 4/2017 |

(Continued)

*Primary Examiner* — Neeraj Sharma

(74) *Attorney, Agent, or Firm* — Ashurst Perkins Coie US LLP

(57) ABSTRACT

Systems and methods for improving telecommunications transcription security by providing transcriptions via integrated telecommunications network components are disclosed. The system detects a communication session via a telecommunications network between two or more user devices. Responsive to determining that at least one of the two or more user devices is associated with an option to transcribe audio data of the communication session, the system provides the communication session to a telecommunications node comprising an integrated-network component configured to transcribe the audio data of the communication session. The system then generates for display, on a graphical user interface (GUI), a visual representation of the transcribed audio data of the communication session at the at least one of the two or more user devices.

18 Claims, 7 Drawing Sheets

(56) References Cited

U.S. PATENT DOCUMENTS 8,886,169 B2 11/2014 Hussain et al.
9,560,206 B2 1/2017 Jones et al.
9,715,876 B2 7/2017 Hager
9,736,298 B2 * 8/2017 Lam .................... H04L 65/4015
9,773,501 B1 9/2017 Brooksby et al.
9,871,916 B2 1/2018 Dingler et al.
9,888,083 B2 2/2018 Poscher et al.
9,900,769 B2 2/2018 Wendling
9,942,401 B2 4/2018 Odinak et al.
9,973,450 B2 5/2018 Jablokov et al.
9,998,686 B2 6/2018 Roylance et al.
10,104,133 B2 10/2018 Tregenza Dancer
10,142,483 B2 11/2018 Li et al.
10,192,553 B1 1/2019 Chenier et al.
11,457,109 B2 9/2022 Myers et al.
11,463,501 B2 10/2022 Kahl et al.
11,594,227 B2 * 2/2023 Hermanns ............... G10L 15/32
11,854,551 B2 12/2023 Peters et al.
11,930,082 B1 3/2024 Singh et al.
12,021,646 B2 6/2024 Kalinichenko et al.
2005/0102140 A1 5/2005 Davne et al.
2006/0111917 A1 5/2006 Dhanakshirur
2007/0032225 A1 * 2/2007 Konicek ................ G08B 13/00
455/417
2011/0014952 A1 1/2011 Minton
2012/0108221 A1 5/2012 Thomas et al.
2014/0068452 A1 3/2014 Joseph et al.
2017/0011740 A1 * 1/2017 Gauci .................. G06F 40/169
2018/0315428 A1 * 11/2018 Johnson .................. G10L 15/26
2020/0075013 A1 * 3/2020 Holm ................ H04M 1/72478
2020/0126541 A1 4/2020 Juckett et al.
2020/0357408 A1 * 11/2020 Boekweg ................ G10L 15/26
2021/0375288 A1 * 12/2021 Thomson ................ G10L 15/30
2023/0074279 A1 * 3/2023 Spitzer-Williams .... G10L 15/26
2023/0122555 A1 * 4/2023 Montero ................. G10L 15/26
704/270
2023/0419967 A1 * 12/2023 Hornberger ............. G10L 15/26
2024/0029538 A1 1/2024 Kuo et al.
2024/0347043 A1 * 10/2024 Qiu ....................... G10L 15/063
2025/0046296 A1 * 2/2025 Velikovich ............ G10L 15/187

FOREIGN PATENT DOCUMENTS

DE 212017000068 U1 9/2018
EP 1277149 A1 1/2003
EP 1545092 A2 6/2005
EP 2659656 B1 7/2018
EP 3342158 A1 7/2018
EP 2751991 B1 6/2019
EP 2983346 B1 8/2019
EP 3113500 B1 4/2020
EP 3659296 A1 6/2020
EP 3202172 B1 6/2023
JP 3640341 B2 1/2005
JP 4949403 B2 3/2012
JP 6457182 B2 12/2018
JP 6998353 B2 12/2021
WO 2015059365 A1 4/2015

* cited by examiner

INTEGRATED TELECOMMUNICATIONS NETWORK TRANSCRIPTION SYSTEMS AND METHODS

BACKGROUND

A wireless network, such as a cellular network, can include an access node (e.g., base station) servicing multiple wireless devices or user equipment (UE) in a geographical area covered by a radio frequency transmission provided by the access node. As technology has evolved, different carriers within the cellular network have utilized different types of radio access technologies (RATs). RATs can include, for example, 3G RATs (e.g., GSM, CDMA, etc.), 4G RATs (e.g., WiMax, Long-Term Evolution (LTE), etc.), or 5G RATs (New Radio (NR)). When using such wireless networks, software applications may be installed on the wireless devices or UE to provide transcription services.

Transcription services may generally refer to the process of converting sound signals (e.g., voice, music, or other audio signals) into alphanumeric content, letters or musical notes, or the like, or transforming data of one medium to that of another medium. For example, a voice call may be transcribed into written language (e.g., a textual representation of the voice call) to enable a user to read the contents of the voice call as opposed to listening to it. In recent years, transcription services have been used in the context of telecommunications to provide users with a textual representation of a voice call. However, while such transcription services may benefit users, such transcription services may be susceptible to one or more security vulnerabilities. For example, while voice calls may be encrypted or protected by other security protocols, existing transcription services lack such protection mechanisms. For instance, existing transcription services are currently provided via a software application installed on a user device and are prone to man-in-the-middle attacks or other security threats. To provide a transcription of a voice call using these services, the user device must receive the voice call, provide it to the software application, and transmit the voice call over one or more computing networks to have a server associated with the software application transcribe the voice call. As the voice call may pass through multiple computing networks, software applications, or other components, the voice call is prone to be intercepted by malicious entities, thereby raising a multitude of privacy concerns. These and other drawbacks exist.

BRIEF DESCRIPTION OF THE DRAWINGS

Detailed descriptions of implementations of the present invention will be described and explained through the use of the accompanying drawings.

Figure 1:
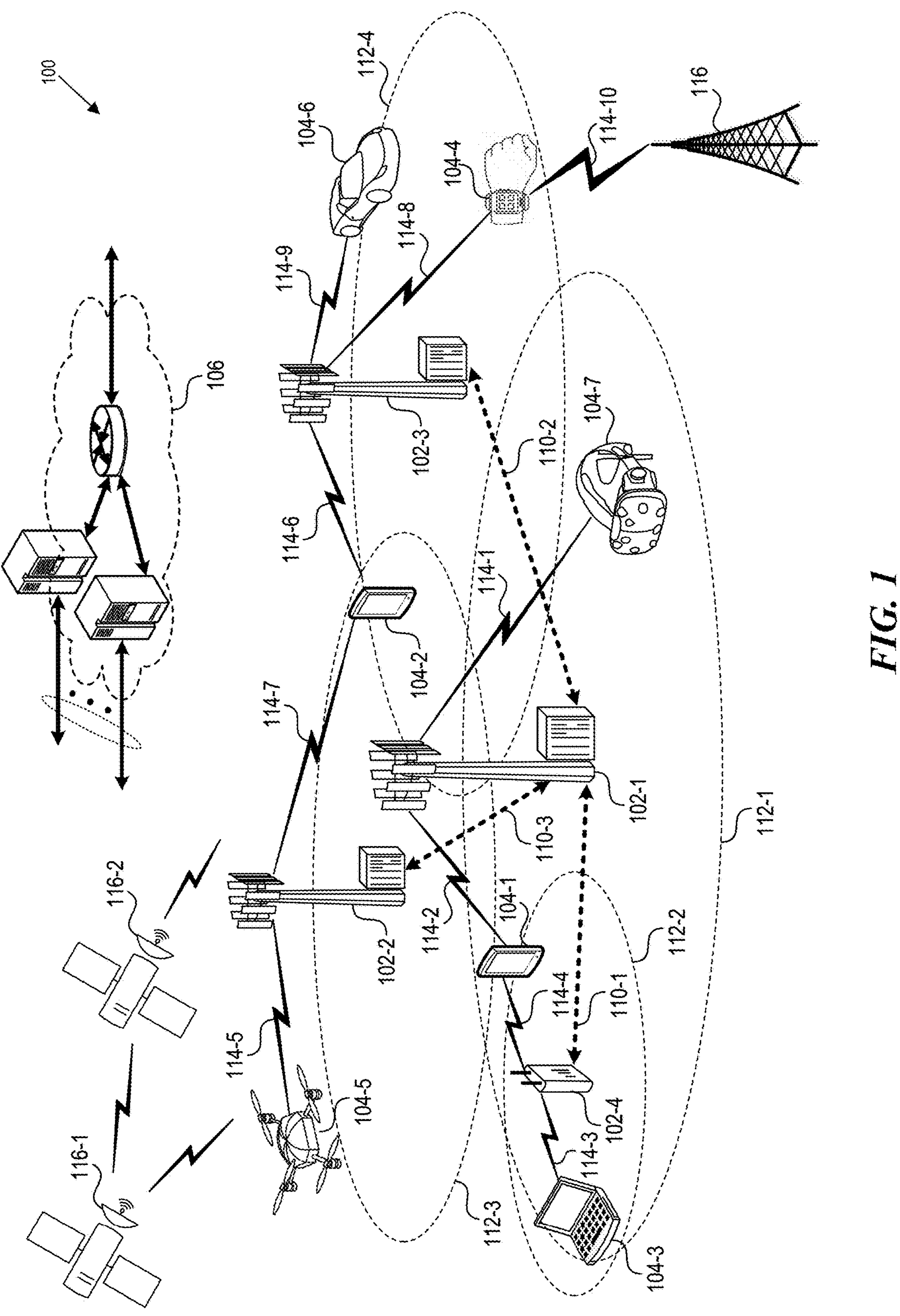
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Transcribing voice calls is a necessity for those who are differently-abled or otherwise have a need for accessibility services. Not only may differently-abled individuals benefit from transcribing voice calls, but also non-differently-abled individuals. For example, transcribing voice calls may enable users to view the call during the voice call, review the voice call at a later time, serve as a reminder for topics discussed during the call, understand what one is saying when in a loud or noisy environment, or have other uses.

However, transcribing voice calls can raise many concerns. For instance, due to the sensitive nature of conversations that may be held over a phone call (e.g., voice call), data privacy concerns are inherent. Prior to transcribing a voice call, all information conveyed during the phone call may be discussed in real time (or near real time) such that only parties involved in the conversation are able to know what has been discussed. Existing systems that provide transcriptions of a voice call, such as a software application installed on a user device, require access to the voice call in real time and record the voice call to be sent to one or more remote web servers to transcribe the phone call. The remote web server may then transmit a message back to the user device (e.g., including the transcribed voice call, or a portion thereof if in near real time) to be displayed on the user device. Such solutions are commonly referred to as "over-the-top" solutions as a software application is installed "on top of" a user device. Although these over-the-top solutions/applications may benefit the user (e.g., by providing a transcription of the voice call), such implementations are prone to data breaches as the voice data must flow from a secure network (e.g., the telecommunications network) to an over-the-top software application, then over the Internet, and back to the software application, which may expose sensitive information (e.g., the voice call) once it leaves the safety of the secure network.

Not only are data privacy concerns raised, but legal and regulatory compliance is also another factor to be considered. For example, existing transcription services may break the law or otherwise be non-compliant with regulations when one or more parties of a phone call are not informed of a recording of the call. For instance, due to the nature in which these over-the-top solutions work, by temporarily recording the voice call (or a portion thereof), such recording of the voice data within the voice call may not be in compliance with one or more legal or regulatory policies. This in and of itself can create barriers to providing transcription services as such transcription services inherently create a record of the voice call, albeit a textual representation, which these laws/policies seek to protect.

In light of these and other drawbacks of existing solutions and systems, there is need for improving telecommunications transcription security. Furthermore, there is a need to provide such transcriptions within a telecommunications network to ensure data integrity, increase transcription security, and provide faster transcriptions of a communication session. Additionally, there is a need to accurately determine whether one or more user devices participating in a voice call are enabled to transcribe audio data of a communication session. Moreover, there is a need to provide a mechanism for delivering secure telecommunications transcriptions to user devices.

The inventors have developed a system for improving telecommunications transcription security by providing transcriptions via integrated telecommunications network components. For example, the inventors have developed a unique telecommunications transcription component (e.g., that is integrated within a telecommunications network) that transcribes audio data of a communication session (e.g., a voice call, phone call, video call, video conference, etc.) that (i) prevents sensitive data from being exposed to insecure environments and (ii) provides real-time (or near real-time) transcriptions of communication sessions to one or more users of a communication session natively.

The system can detect a communication session via a telecommunications network between two or more user devices. For example, the system may detect whether a communication session has been initiated by a user device (e.g., a cellular phone, a laptop computer, a wearable device, or other user device) that is between the user device and another user device. The system can then determine whether at least one of the two or more user devices is associated with an option to transcribe audio data of the communication session. For example, as providing a transcription of a communication session may be associated with an option of a telecommunications service plan of one user device but not another, the system determines which user device is associated with an option to transcribe audio data of the communication session. In this way, the system can provide a transcription of the communication session irrespective of which user device participating in the communication session has initiated the communication session. That is, as opposed to existing systems that only enable transcription of a communication session, if enabled, based on an originating end (e.g., the user device that initiated a phone call), the system can nonetheless provide the transcription of the communication session if the terminating end (e.g., the user device that receives a phone call) is associated with the option to transcribe audio data of the communication session.

In response to determining that at least one of the two or more user devices is associated with the option to transcribe the audio data of the communication session, the system provides the communication session to a telecommunications node that comprises an integrated-network component configured to transcribe the audio data of the communication session. For example, the integrated-network component can be part of the telecommunications network (e.g., a telecommunications networks' hardware/software that provides wired/wireless communication services). For instance, as opposed to over-the-top transcription services that are a third party to the telecommunications network that may expose sensitive data (e.g., user conversational data) to unsecured computing components, the system leverages the security provided by the telecommunications network to provide the transcription of a communication session. In this way, the system may improve transcription security by providing transcription of a communication session via an integrated-network component.

Moreover, by providing such communication session transcription via an integrated-network component, the system may increase the speed at which the transcription may be provided to one or more user devices within the communication session. For example, as opposed to over-the-top solutions of existing systems, the transcription of the communication session via an integrated-network component occurs in parallel with the transmitting of the audio data of a communication session (e.g., as the audio data is transmitted among telecommunications hardware, such as cell towers). By doing so, the system need not wait for the audio data of a communication session to physically be received at a user device prior to any transcription process to occur, but rather is processed in parallel as audio data is transmitted within the telecommunications network. In this way, the system reduces transcription latency by transcribing the audio data of a communication session via the integrated-network component.

The system can also generate for display, on a graphical user interface (GUI), a visual representation of the transcribed audio data of the communication session at the at least one of the two or more user devices. For example, the system can generate a visual representation (e.g., textual data representing the transcribed audio data) on a user interface of user devices that are participating within the communication session. The visual representation may be provided via a Real-Time-Text (RTT) protocol that is based on the integrated-network component's transcription of the audio data. In this way, the system may provide secure, real-time, and native transcriptions of communication sessions to user devices participating in the communication session.

In various implementations, the methods and systems described herein can improve telecommunications transcription security by providing transcription via integrated-network components. For example, the system can detect a communication session over a telecommunications network between two or more user devices. The system can determine whether at least one of the two or more user devices is associated with an option to transcribe audio data of the communication session. In response to determining that at least one of the two or more user devices is associated with the option to transcribe the audio data of the communication session, the system can provide the communication session to a telecommunications node comprising an integrated-network component configured to transcribe the audio data of the communication session. The system can generate, for display, on a GUI, a visual representation of the transcribed audio data of the communication session at the at least one of the two or more user devices.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail to avoid unnecessarily obscuring the descriptions of examples.

Wireless Communications System

FIG. 1 is a block diagram that illustrates a wireless telecommunications network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, a radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The coverage area 112 for a base station 102 can be divided into sectors making up only a portion of the coverage area (not shown). The network 100 can include base stations of different types (e.g., macro and/or small cell base stations). In some implementations, there can be overlapping coverage areas 112 for different service environments (e.g., Internet of Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term "eNBs" is used to describe the base stations 102, and in 5G NR networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances; etc.

A wireless device (e.g., wireless devices 104) can be referred to as a UE, a customer premises equipment (CPE), a mobile station, a subscriber station, a mobile unit, a subscriber unit, a wireless unit, a remote unit, a handheld mobile device, a remote device, a mobile subscriber station, a terminal equipment, an access terminal, a mobile terminal, a wireless terminal, a remote terminal, a handset, a mobile client, a client, or the like.

A wireless device can communicate with various types of base stations and network 100 equipment at the edge of the network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-10 (also referred to individually as "communication link 114" or collectively as "communication links 114") shown in network 100 include uplink (UL) transmissions from a wireless device 104 to a base station 102 and/or downlink (DL) transmissions from a base station 102 to a wireless device 104. The DL transmissions can also be called forward link transmissions while the UL transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites, such as satellites 116-1 and 116-2, to deliver services anywhere and anytime and provide coverage in areas that are unreachable by any conventional Terrestrial Network (TN). A terrestrial network is enabled through the base stations 102 or antenna 116. A 6G implementation of the network 100 can support terahertz (THz) communications. This can support wireless applications that demand ultra-high quality of service (QOS) requirements and multi-terabits-per-second data transmission in the era of 6G and beyond, such as terabit-per-second backhaul systems, ultra-high-definition content streaming among mobile devices, AR/VR, and wireless high-bandwidth secure communications. In another example of 6G, the network 100 can implement a converged Radio Access Network (RAN) and core architecture to achieve Control and User Plane Separation (CUPS) and achieve extremely low user plane latency. In yet another example of 6G, the network 100 can implement a converged Wi-Fi and core architecture to increase and improve indoor coverage.

5G Core Network Functions

Figure 2:
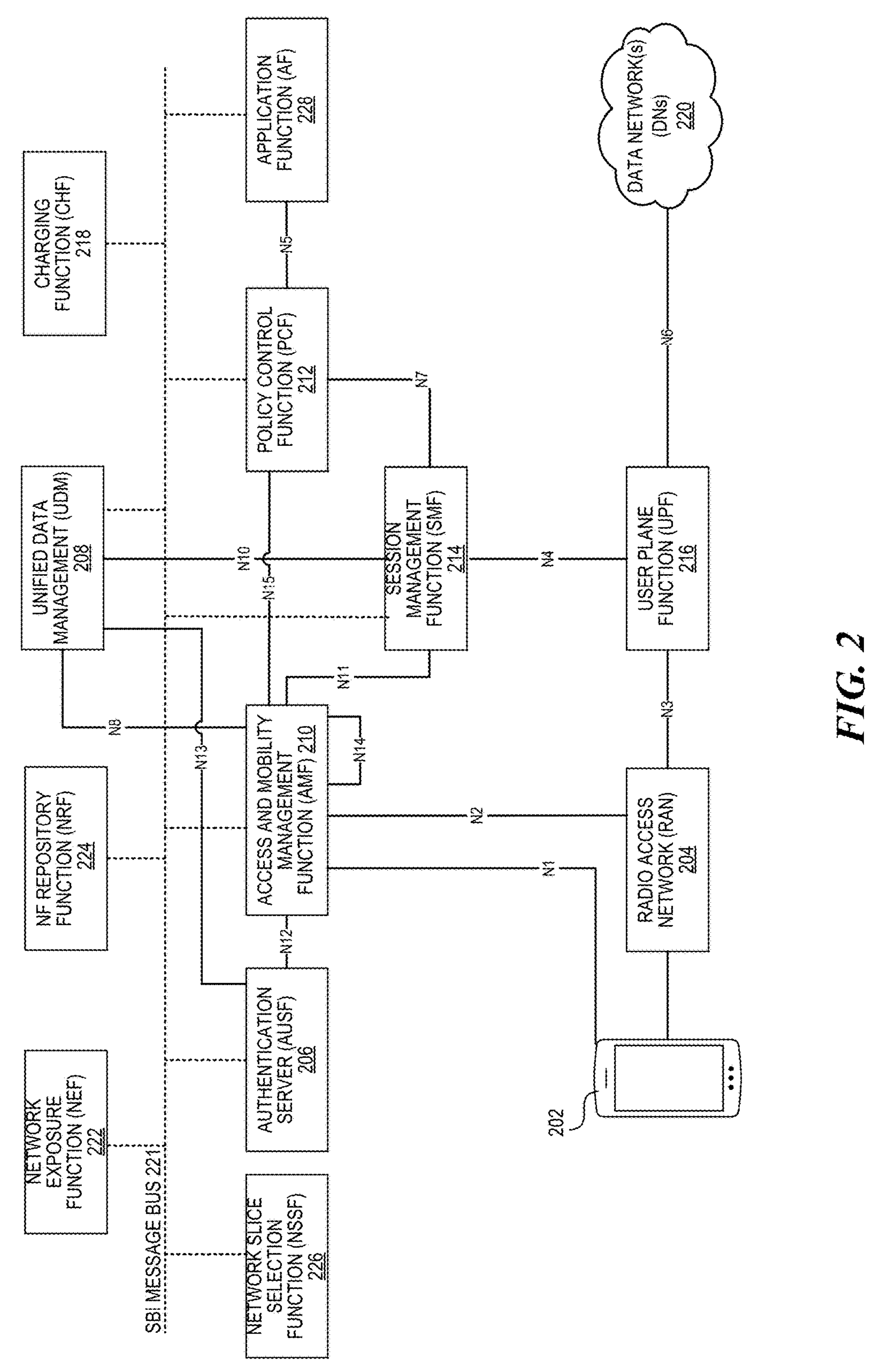
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility Management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service-Based Architecture (SBA) through a Service-Based Interface (SBI) 221 that uses HTTP/2. The SBA can include a Network Exposure Function (NEF) 222, an NF Repository Function (NRF) 224, a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, and service-level agreements and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain a voluminous amount of data that is accessed for authentication. Thus, the UDM 208 is analogous to a Home Subscriber Server (HSS) and can provide authentication credentials while being employed by the AMF 210 and SMF 214 to retrieve subscriber data and context.

The PCF 212 can connect with one or more Application Functions (AFs) 228. The PCF 212 supports a unified policy framework within the 5G infrastructure for governing network behavior. The PCF 212 accesses the subscription information required to make policy decisions from the UDM 208 and then provides the appropriate policy rules to the control plane functions so that they can enforce them. The SCP (not shown) provides a highly distributed multi-access edge compute cloud environment and a single point of entry for a cluster of NFs once they have been successfully discovered by the NRF 224. This allows the SCP to become the delegated discovery point in a datacenter, offloading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224 use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework that, along with the more typical QoS and charging rules, includes network slice selection, which is regulated by the NSSF 226.

In some implementations, an integrated-network component configured to transcribe communication session data may be part of AFs 228, which may represent a telecommunications node. For example, the integrated-network component may be a machine learning model, an automated speech recognizing (ASR) model, a natural language processing model, or other model configured to transcribe communication session data. The system may detect a communication session over a telecommunications network (e.g., network 100 (FIG. 1)) via one or more components of architecture 200. As an example, the AMF 210 may receive a request from a user device (e.g., wireless device 202) to initiate a communication session with another user device. The AMF 210 may forward the request (e.g., a Session-Initiated-Protocol (SIP) message) to SMF 214 to initiate the communication session between the at least two user devices.

When the AMF 210 forwards the request to SMF 214, the system can determine whether at least one of the two or more user devices is associated with an option to transcribe communication data (e.g., audio data, video data, etc.) of the communication session by using PCF 212 (e.g., which may include user device/user service data, such as indicating whether a given user device is associated with an option to transcribe the communication data). In response to determining that at least one of the two or more user devices is associated with the option to transcribe the communication data of the communication session, the system can provide the communication session (e.g., the audio data, the video data, or other data of the communication session), or a portion thereof (e.g., segmented portions of the communication session), to the AF 228, which may host the integrated-network component configured to transcribe communication data of the communication session.

To transcribe/translate communication data of the communication session, AF 228 can receive communication data of the communication session. In some implementations, when the request (e.g., a SIP message, VoIP request) is received by the AMF 210 and a connection is established between a first user device and a second user device, the communication data (e.g., voice, text, video, or other data) may be forked to AF 228 for transcription or translation (e.g., into a given language). For instance, the forked communication data can be forked by AMF 210 to AF 228 by a media resource function that is part of AMF 210. Such media resource function, for example, may handle streamed communication data of a communication session between two or more user devices to enable the two or more user devices to communicate with each other.

In some implementations, when the request (e.g., a SIP message, VoIP request) is received by the AMF 210 and a connection is established between two or more user devices, AMF 210 may invoke SIP Recording (SIPREC) to fork the communication data of the communication session to AF 228 to be transcribed or translated. For example, SIPREC may refer to Session Initiation Protocol Recording which records communication session data of a communication session. SIPREC enables real-time capturing and recoding of communication session data which may be provided to AF 228 to be transcribed or translated.

In some implementations, when the request (e.g., a SIP message, VoIP request) is received by the AMF 210 and a connection is established between two or more user devices, AMF 210 may provide the communication session data of the communication session to the AF 228. AF 228 can then invoke SIP Hair-pinning. SIP Hair-pinning (or SIP loop-backing) may refer to the scenario where the communication session data of the communication session is provided to a logical component (e.g., AF 228) to intercept the communication session data (e.g., to be transcribed, translated, or other purpose) and re-routed from the logical component back to the desired endpoint (e.g., a user device). For instance, SIP hair-pinning may function as a middle-man that sits between two or more user devices that can record the communication session data of the communication session (e.g., via SIPREC or other recoding methods) without interrupting the flow of the communication session data, such as by updating call signaling such that media packets being hair-pinned using Real-time Transport Protocol (RTP) are routed via AF-228. By doing so, the communication session data of the communication session can be transcribed, translated, or processed in real-time (or near-real time).

Improving Telecommunications Transcription Security

Figure 3:
FIG. 3 is a flowchart illustrating a process for improving transcription security by providing transcriptions via integrated telecommunications network components, in accordance with one or more implementations of the present technology.
Figure 3:
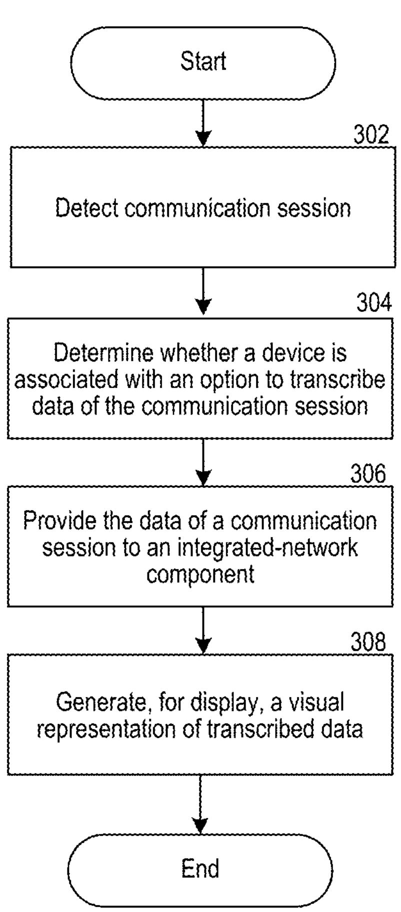

FIG. 3 is a flowchart illustrating a process for improving transcription security by providing transcriptions via integrated telecommunications network components, in accordance with one or more implementations of the present technology.

At act 302, process 300 can detect a communication session. For example, the system (e.g., process 300, implemented by one or more components of FIG. 1 or FIG. 2) can detect a communication session over a telecommunications network (e.g., network 100 (FIG. 1)) between two or more user devices. The communication session can be any communication session that uses, at least in part, the telecommunications network to convey communication data of the communication session between the two or more user devices. For example, the communication session can be an audio call (e.g., a voice call, a cell phone call, a landline call, etc.), a video call (e.g., a video conference, a VOLTE call, etc.), or other communication session that enables one or more users to convey information of a conversation, dialogue, chat, discussion, or other exchange via respective user devices.

The user devices may be any wired or wireless devices (e.g., wireless device 104 (FIG. 1)) that are configured to communicate with one another using, at least in part, a telecommunications network (e.g., network 100 (FIG. 1)). As described above, the system may use one or more network components (e.g., of architecture 200 (FIG. 2)) to detect the communication session over a telecommunications network between two or more user devices. The communication session may be a session in which two or more user devices can communicate with one another. As an example, during a communication session a first user device and a second user device may communicate via audio data, video data, both audio and video data, or the like. As another example, a first user device, a second user device, and a third user device may communicate via audio data, video data, both audio and video data, or the like. In accordance with one or more implementations of the present technology, the communication session may involve one, two, three, . . . 10, . . . , 15, . . . 100, . . . 1000, . . . or more user devices, each communicating with each other during the communication session.

Figure 4:
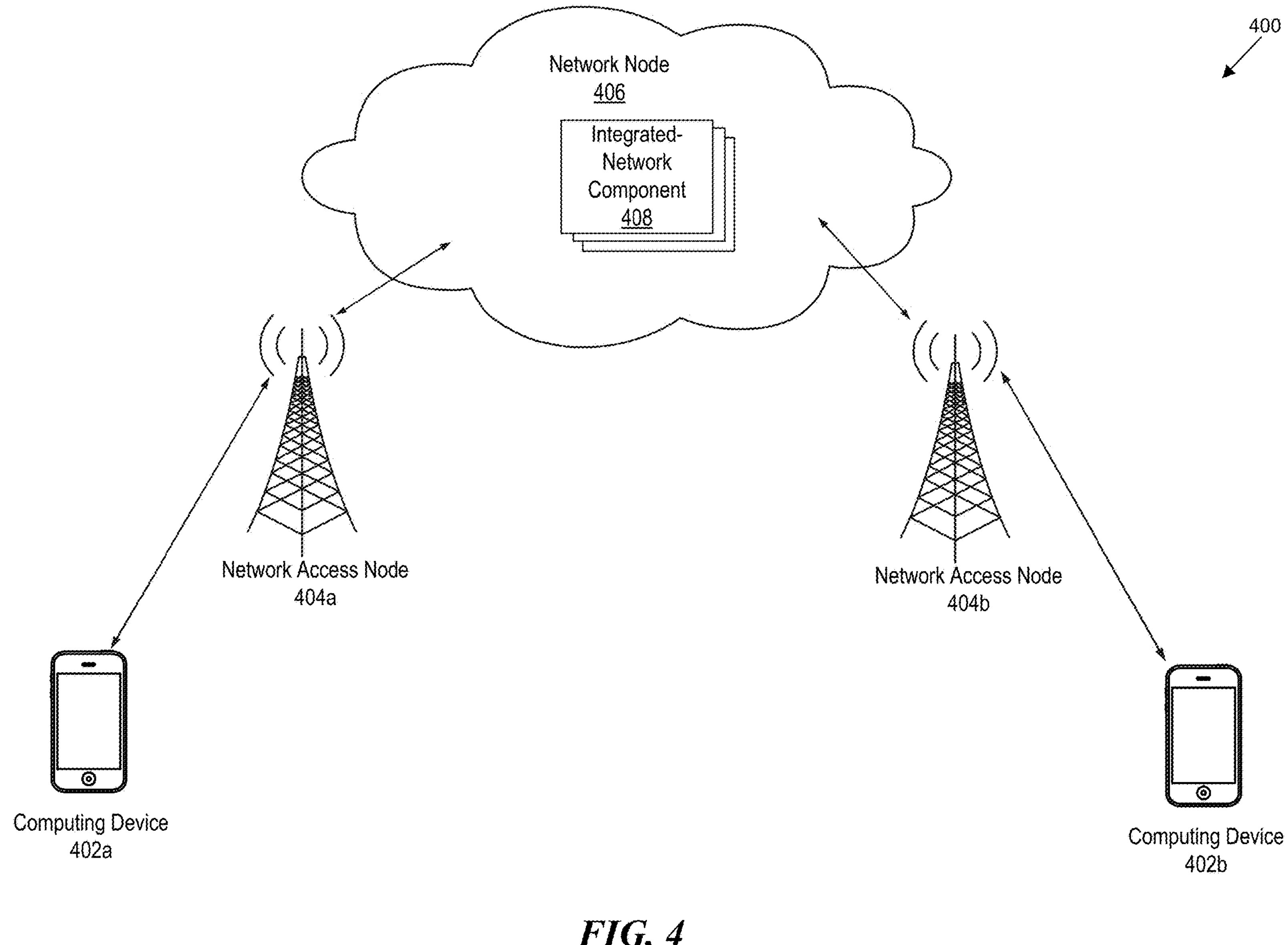
FIG. 4 is a block diagram that illustrates two or more user devices engaging in a communication session, in accordance with one or more implementations of the present technology.

Referring to FIG. 4, which shows a block diagram that illustrates two or more user devices engaging in a communication session, in accordance with one or more implementations of the present technology. First computing device 402*a* (which may correspond to a first user device, or a first wireless device 104 (FIG. 1)) may communicate with second computing device 402*b* (which may correspond to a second user device, or a second wireless device 104 (FIG. 1)), using network access nodes 404*a*, 404*b*, via network node 406 during a communication session 400. Network access node 404*a* and network access node 404*b* may respectively correspond to either the base stations 102 or antennas 116, which may be part of network 100 (FIG. 1). Additionally, network node 406 may correspond to core network 106, which may include one or more components of FIG. 2, including the integrated-network component. In some implementations, while network access node 404*a* and network access node 404*b* are shown as base stations or other antenna, network access node 404*a* and network access node 404*b* may be other access points, such as Wi-Fi routers or other components that enable wireless communication (e.g., Wi-Fi, Bluetooth, NFC, RFID), in accordance with one or more implementations of the present technology.

The system may detect a communication session 400 between computing device 402*a* and computing device 402*b* using a received SIP message at network node 406. For instance, the system may receive, from computing device 402*a*, where computing device 402*a* is the originating party (e.g., initiating the communication session), a request (e.g., a SIP message, a VoIP message, etc.). For example, the request may be any request, such as a SIP message to engage in a communication session with computing device 402*b*. The SIP message may include information such as, but not limited to, identifying information of computing device(s) 402*a* and 402*b* (e.g., phone numbers, IP addresses, serial numbers, device identifiers, etc.), SIP standards, headers, timestamps, or other information. The system can detect the communication session 400 between computing devices 402*a* and 402*b* using the SIP message by parsing the SIP message for identifying information of each of the computing devices 402*a* and 402*b* included in the SIP message.

In some implementations, the system can detect the communication session 400 between computing devices 402*a* and 402*b* when the terminating party (e.g., the user device that is receiving the communication session request, such as computing device 402*b*), provides a response (e.g., another SIP message) back to the originating party indicating that the terminating party accepts the communication session (e.g., accepts engagement within the communication session). In some implementations, the communication session 400 may be maintained until one computing device 402*a* or 402*b* (or other computing devices when more than two computing devices 402 are within a communication session) ends the communication session (e.g., via another SIP message indicating to end the communication session).

Referring back to FIG. 3, at act 304, process 300 can determine whether a device is associated with an option to transcribe data of the communication session. For example, the system can determine whether at least one of the two or more user devices is associated with an option to transcribe audio data of the communication session. The system may leverage identifying information of the one or more user devices of the SIP messages exchanged (e.g., when establishing the communication session) to determine whether one or more user devices of the communication session is associated with the option to transcribe the audio data of the communication session.

As opposed to existing systems that may only provide transcriptions of communication sessions when an originating party is associated with a telecommunications network service provider that provides a transcription service, the system may provide transcription of the communication session irrespective of whether the originating party or the terminating party is associated with the option. For example, as telecommunications network service providers may offer transcription of communication sessions to subscribers of a given service plan, existing systems may only provide such transcription if the originating party is associated with the service plan offering the transcription service. That is, existing systems lack a mechanism to detect whether a terminating party is associated with a service plan offering the transcription service. On the contrary, however, the system leverages the SIP messages' identifying information of the user devices to determine whether any of the user devices participating in a communication session is associated with the option to transcribe the communication session. For example, the system may use phone numbers associated with the user devices to access a database (or alternatively, PCF 212 (FIG. 2)) to determine whether any of the user devices are associated with the option to transcribe the communication session, where the database or the PCF 212 stores information indictive of user service plans, agreements, or other service options that may be associated with respective user devices. In this way, the system provides transcription of the communication session irrespective of which user device is the originating party or the terminating party, thereby improving utilization of transcription services.

In some implementations, the system can transcribe mediums other than audio data of a communication session. For example, where the communication session involves a video call, the system can extract the audio data from the video call to transcribe the audio data of the video call. In other implementations, where the communication session is of a video call format (e.g., involves video), the system can transcribe what is visually appearing during the video call. For instance, where one party of the communication session communicates via American Sign Language (ASL), or other physical means of communicating, the system may use video recognition, image recognition, or other visual recognition models, engines, or algorithms to transcribe ASL communications. For example, the system may use one or more video recognition models that may be part of an integrated-network component to preserve data integrity and transcription security.

At act 306, process 300 can provide the data of the communication session to an integrated-network component. For example, in response to determining that at least one of the two or more user devices is associated with the option to transcribe the audio data of the communication session, the system provides the communication session to a telecommunications node comprising an integrated-network component configured to transcribe the audio data (e.g., the communication data) of the communication session.

Referring back to FIG. 4, in response to determining that at least one of the two or more user devices is associated with the option to transcribe the audio data of the communication session, the system may provide the communication session (or a portion thereof) to integrated-network component 408. For example, in some implementations, the integrated-network component 408 can be part of a telecommunications network or a telecommunications node (e.g., network node 406). For instance, as opposed to existing systems that provide over-the-top solutions to transcribing data, the system improves communication security by leveraging "on-network" or "within-network" components. The integrated-network component 408 may be a node of the telecommunications network or other integrated-network component 408 that is integrated into the telecommunications network.

Moreover, use of the integrated-network component 408 is not limited to merely a user device that is associated with the telecommunications network that provides the integrated-network component 408. For example, where the integrated-network component 408 is associated with a first telecommunications network (e.g., service provider), a user of a different telecommunications network may nonetheless benefit from the integrated-network component 408. That is, at least one party during a communication session need be associated with the telecommunications network that supports the integrated-network component 408. In this way, multiple users may benefit from the integrated-network component's transcription service where only one user of a given session may be associated with the telecommunications network that provides access to the integrated-network component 408, thereby improving the user experience.

In some implementations, the system can provide a set of portions of the communication session to the integrated-network component 408. For example, to provide more efficient and reliable transcriptions of the communication session, the system may partition the communication session into a set of portions. For instance, the set of portions of the communication session may be performed in real time, or in near real time, where each portion of the set of portions is related to each other in time. That is, the set of portions may be "parts" of a dialogue between two users using first computing device 402*a* and second computing device 402*b*, such that each portion of the dialogue (e.g., conversation) occurs with respect to time. For instance, during a phone call, users may speak in a request-response pattern or at the same time. As the system seeks to provide real-time (or near real-time) transcription of the communication session, the system may generate a set of portions of the communication session, where each portion of the communication session includes audio/video data of the communication session for a given time period (1 millisecond, 2 milliseconds, 3 milliseconds, 1 second, 2 seconds, etc.). As each portion can be generated during the duration of the communication session, the system may provide each portion (e.g., one at a time, or multiple together) to the integrated-network component to transcribe the audio data included in each portion in succession of each other, thereby reducing the amount of computer processing and memory resources experienced by the integrated-network component when transcribing the audio data. In this way, the system facilitates faster transcription of a communication session as portions of the communication session are transcribed in succession as communication session portions.

In some implementations, the system may determine whether a user device of the communication session is associated with a default option to transcribe audio data of the communication session. For example, the system can access a database storing account information associated with the user devices using user device identifiers (e.g., International Mobile Equipment Identity (IMEI) numbers, serial numbers, phone numbers, etc.) to determine whether at least one of the two or more user devices is associated with an option to transcribe the audio data. The system may parse the database using the device identifiers to determine whether the option to transcribe audio data of the communication session is enabled as a default option (e.g., based on a match). In this way, the system may automatically provide transcription of the communication session each time at least one of the user devices involved in a communication session is enabled to transcribe the audio data, thereby improving the user experience.

In some implementations, the system can parse a SIP message to determine whether a user device of the communication session is associated with an option to transcribe audio data of the communication session. For example, as opposed to a default option, each time a user initiates a call (e.g., using the user's user device) with another user device, the system may generate for display an option for the user to select to transcribe the audio data that will be transmitted and received during the communication session. When the user selected the option to transcribe the audio data, the user device can modify a SIP message to indicate that the user has selected an option to transcribe the audio data of the communication session. The SIP message can include one or more identifiers for a recipient phone number, IMS server address, sender IP address, sender phone number, size of message being sent, options (e.g., whether to transcribe audio), agent information, media format (e.g., audio, video, etc.), codecs information, media communication protocol, or other information.

For example, in the context of audio communication sessions (e.g., a telephone call), the user device may generate a SIP message which may include the user-selected option indicating to transcribe the audio data of the communication session. The integrated-component may receive the SIP message and may parse the SIP message to determine whether the SIP message includes the user-selected option indicating to transcribe the audio data of the communication session. In response to determining that the SIP message includes the user-selected option indicating to transcribe the audio data of the communication session, the system can determine that the at least one of the two or more user devices (e.g., engaging in the communication session) is associated with the option to transcribe the audio data of the communication session. In this way, the user may select on a per-call basis (e.g., per communication session basis)

whether or not they would like the audio data transcribed, thereby reducing the utilization of computational resources experienced by the integrated-network component by only transcribing audio data of the communication session when instructed to do so (e.g., as opposed to transcribing each communication session by default).

In some implementations, the system can determine whether a user device of the communication session is associated with an option to transcribe audio data of the communication session using contact-specific information. For example, the system can extract a user device identifier associated with each user device engaging in a communication session using the received SIP message (or SIP messages). The system can then access a database storing service data of at least one of the two or more user devices using the extracted user device identifiers. For instance, when a user device initiates a communication session with another user device, the user device may or may not be associated with the telecommunications service provider. However, the other user device may be associated with the telecommunications service provider.

The telecommunications service provider may store service data (e.g., indicating permissions, access rights, service agreements, options, etc.) users have with respect to the telecommunications service provider in a database. To ensure that transcription of audio data can occur irrespective of which user initiates the communication session, the system can parse the database using the user device identifiers to determine which user device is associated with the telecommunications service provider. Upon determining which user device is associated with the telecommunications service provider, the system can then determine whether any of the two or more user devices is associated with an option indicating to transcribe the audio data of the communication session.

For example, a user may specify that each time a communication session is initiated, engaged, or conducted with a particular user device/user (e.g., a given contact), the system is instructed to transcribe the communication session. In this way, the system need not rely on a user-specified indication as to whether to transcribe the audio data of the communication session each time a communication session is initiated, but rather based on a contact a user is communicating with. That is, determining whether to transcribe the audio data of the communication session can be based on whether a given contact is part of the communication session, thereby further reducing the utilization of computational resources involved with transcribing audio data (e.g., as opposed to a default option).

Moreover, by basing whether to transcribe the audio data of a communication session on whether a particular contact is part of the communication session, the system can transcribe the audio data irrespective of which user or user device initiated the communication session. For instance, while one telecommunications service provider may provide a transcription service, another telecommunications service provider may not. From the perspective of the telecommunications service provider that does provide the transcription service, the system may determine whether any of the user devices that are part of the communication sessions is associated with an indication to transcribe the audio data, thereby enabling transcription of the audio data irrespective of which user initiated the communication session. That is, transcription of the audio data need not rely on which user initiated the communication session as long as (i) one of the user devices is associated with the telecommunications service provider that does provide the transcription service and (ii) at least one of the user devices engaging within the communication sessions is associated with an option to have the audio data transcribed.

In some implementations, the system can transcribe the audio data of the communication session based on a verbal indication. For example, during a communication session, the system can process the audio data of the communication session to determine whether at least one user (e.g., of two or more users) engaging within the communication session verbally indicates to transcribe the audio data of the communication session. For instance, the system can process the audio data using a speech recognition model (e.g., automatic speech recognition model, or other speech recognition models) to determine whether a user engaging within the communication session indicates to transcribe the audio data. The speech recognition model may process the audio data in real time (or near real time) to identify a user indication, such as "I wish we could transcribe this call," "please transcribe this call," "provide a text version of this call," or other user indication.

In response to determining that at least one user of the two or more users of the communication session verbally indicates to transcribe the audio data of the communication session, the system can determine that at least one of the two or more user devices is associated with an option to transcribe the audio data of the communication session. As such, the system can then provide the communication session to the integrated-network component to transcribe the audio data of the communication session. In this way, the system can trigger the transcription of the communication session "on the fly" or in "real time" without a previous user indication (e.g., before the communication session) as to whether or not to transcribe the audio data.

In some implementations, the system can transcribe the audio data of the communication session using a quality criterion. For example, the system can detect during the communication session whether a quality criterion of the communication session fails to satisfy a threshold quality criterion. The quality criterion can be of the communication session latency, jitter, jitter buffer discard rate, packet loss, or other quality criterion. The threshold quality criterion can correspond to the quality criterion, such as a threshold latency time period (e.g., 5 milliseconds, 100 milliseconds, 150 milliseconds), a threshold jitter rate (e.g., 20 milliseconds, 30 milliseconds, 40 milliseconds, etc.), a threshold value rate (e.g., percentage, ratio, decimal, etc.) of a jitter buffer discard rate, a threshold amount of packets, or other threshold quality criterion. In some implementations, the system may determine that the quality criterion of the communication session fails to satisfy the threshold quality criterion when the quality criterion meets or exceed the threshold quality criterion. For example, where the quality criterion is of communication session latency indicating 200 milliseconds, and the threshold quality criterion is 150 milliseconds, the system may determine that the quality criterion fails to satisfy the threshold quality criterion (e.g., indicating a low quality call or communication session).

In response to detecting that the quality criterion of the communication session fails to satisfy the threshold quality criterion, the system determines that at least one of the two or more user devices is associated with the option to transcribe the audio data of the communication session. In this way, when a communication session is of low quality, the system automatically transcribes the communication session, thereby improving communication session quality as the system can provide a transcript of the call to each user device engaging in the communication session.

In some implementations, the system can determine that a user device is associated with an option to transcribe the audio data if the communication session is based on whether any device that is part of the communication session is communicating via a satellite network. For example, as satellite networks may be limited in the services they are able to provide (e.g., voice, data, etc.), if a user device that is part of the communication session is communicating via a satellite network, the system may transcribe the audio of the communication session to be sent to the device that is communicating via the satellite network.

For example, the system may parse a SIP message of each device of the devices engaging in the communication session. The system may identify a network identifier that may be included in the SIP message (e.g., of each device) that indicates that a satellite network is being utilized by a given user device. In response to determining that any of the two or more user devices (e.g., engaging in the communication session) is communicating via a satellite network, the system may determine whether at least one of the two or more user devices is associated with the option to transcribe the audio data of the communication session. In this way, the system may reduce the utilization of valuable satellite communication bandwidth by providing a transcription of the audio data of the non-satellite network user devices.

Moreover, in some implementations, in response to detecting that a user device engaging in the communication session is communicating via a satellite network, the system may, for that user device, prevent audio data from being provided to that user device during the communication session in favor of the transcribed audio data. As mentioned above, due to the limited bandwidth of satellite networks, the system may preserve bandwidth by foregoing the transmission of audio data to a user device that is communicating via a satellite network. The system may alternatively provide transcribed audio to the user device, thereby reducing the amount of wasted satellite network bandwidth.

In some implementations, the system can determine whether at least one of the two or more user devices is associated with an option to transcribe audio data of the communication session where at least one of the user devices is associated with an emergency service provider. For example, the system may extract user identifiers of a SIP message (or SIP messages) to determine whether any of the user devices are associated with an emergency service provider. For example, the system may query one or more databases using the extracted user device identifiers to determine whether a phone number (or other user device identifier) is associated with an emergency service provider (e.g., 911, sheriffs' office, fire department, search and rescue team, etc.).

In response to determining that at least one of the extracted user device identifiers is associated with an emergency service provider, the system determines that at least one of the two or more user devices are associated with the option to transcribe the audio data of the communication session. In this way, the system facilitates automatic triggering of audio transcription of a communication session in response to at least one party of the communication session being an emergency service provider, thereby improving the safety of users.

In some implementations, the system can transcribe audio data from a first language to a second language. For example, where the data of the communication session includes audio data, the system can detect that at least one portion of the audio data of the communication session is in a first language. As users of mobile devices may communicate in different languages, it is advantageous to transcribe audio in one language to another language. As such, the system can detect, via the integrated-network component, whether a portion of the audio data is in a first language (e.g., English). To detect which language the portion of the audio data is in, the system can provide the portion of the audio data to the integrated-network component which may be configured to automatically detect speech and the language in which it is in. The system can then determine that at least one of two or more user devices (e.g., participating in the communication session) is associated with an option to transcribe the audio data of the communication session into a second language. For example, one mobile device participating in the communication session may have a previously stored setting (e.g., via PCF 212 (FIG. 2)) indicating that transcribed audio data can be transcribed into a language of their choosing (e.g., Spanish).

In some implementations, the system can determine that at least one of the two or more users devices is associated with the option to transcribe the audio data of the communication session into a second language dynamically. For example, the integrated-network component can determine (e.g., in real-time or near real-time), whether a user participating in the communication session verbally indicates that s/he would like the audio data of the communication session transcribed into a different language. For instance, the user may indicate "Can I have a transcribed version of this call in Spanish?" The system can recognize such dynamically-triggered instances of transcription services, and may provide a transcribed version of the audio data to the user device to which requested the transcribed audio data.

The system can then transcribe the at least one portion of the audio data of the communication session in the first language into the second language using the integrated-network component. For example, the integrated-network component can be configured to transcribe audio data into different languages. Upon transcribing the audio data, the system can transmit the transcribed audio data (e.g., in the different language) to at least one of the two or more user devices. For instance, the system can transmit the transcribed audio data (e.g., now in Spanish) to the user device associated with the option to transcribe audio data to that of Spanish. As another example, the system can transmit the transcribed audio data to each of the user devices participating in the communication session. In this way, system enhances the user experience as transcribed data of a communication session is not limited to a given language.

Referring back to FIG. 3, at act 308, process 300 can generate, for display, a visual representation of transcribed data. For example, the system can generate, for display, on a GUI, a visual representation of the transcribed audio data of the communication session at the at least one of the two or more user devices. The visual representation of the transcribed audio data (or other communication data) may be of a RTT protocol, a Speech-To-Text protocol, a text message (e.g., SMS message), email, or other textual representation of the transcribed audio data. In some implementations, the visual representation of the transcribed audio data may alternatively be a physical representation of the transcribed audio/video data of the communication session. For example, the physical representation can include a braille representation of the transcribed audio data (e.g., for the visually impaired), a series of vibrations (e.g., via a vibrating motor on a user device) indicating the transcribed audio data, or a series of audio signals (e.g., beeps) in morse code, in accordance with some implementation of the present technology.

In some implementations, the system can transmit a textual representation of the audio data of the communication session to each of (i) the first mobile device and (ii) the second mobile device using the transcribed audio data. The textual representation can be capable of being displayed on a graphical user interface (GUI) of the first and second mobile devices. For instance, the integrated-network component can generate a textual representation of the transcribed audio data to be transmitted to a mobile device. The integrated-network component can then transmit the textual representation of the transcribed audio data to the mobile device, where the mobile device is caused to display the textual representation of the transcribed audio data on a GUI of the mobile device (e.g., via a RTT interface). In this way, the system provides faster transcription services by generating the textual representation via the integrated-network component, as opposed to requiring the mobile device to generate the visual representation. Moreover, in this way, the system may enhance transcription services by generating and transmitting the textual representation of the transcribed audio data where the user device is unable to natively generate the visual representation of the transcribed audio data.

Figure 5:
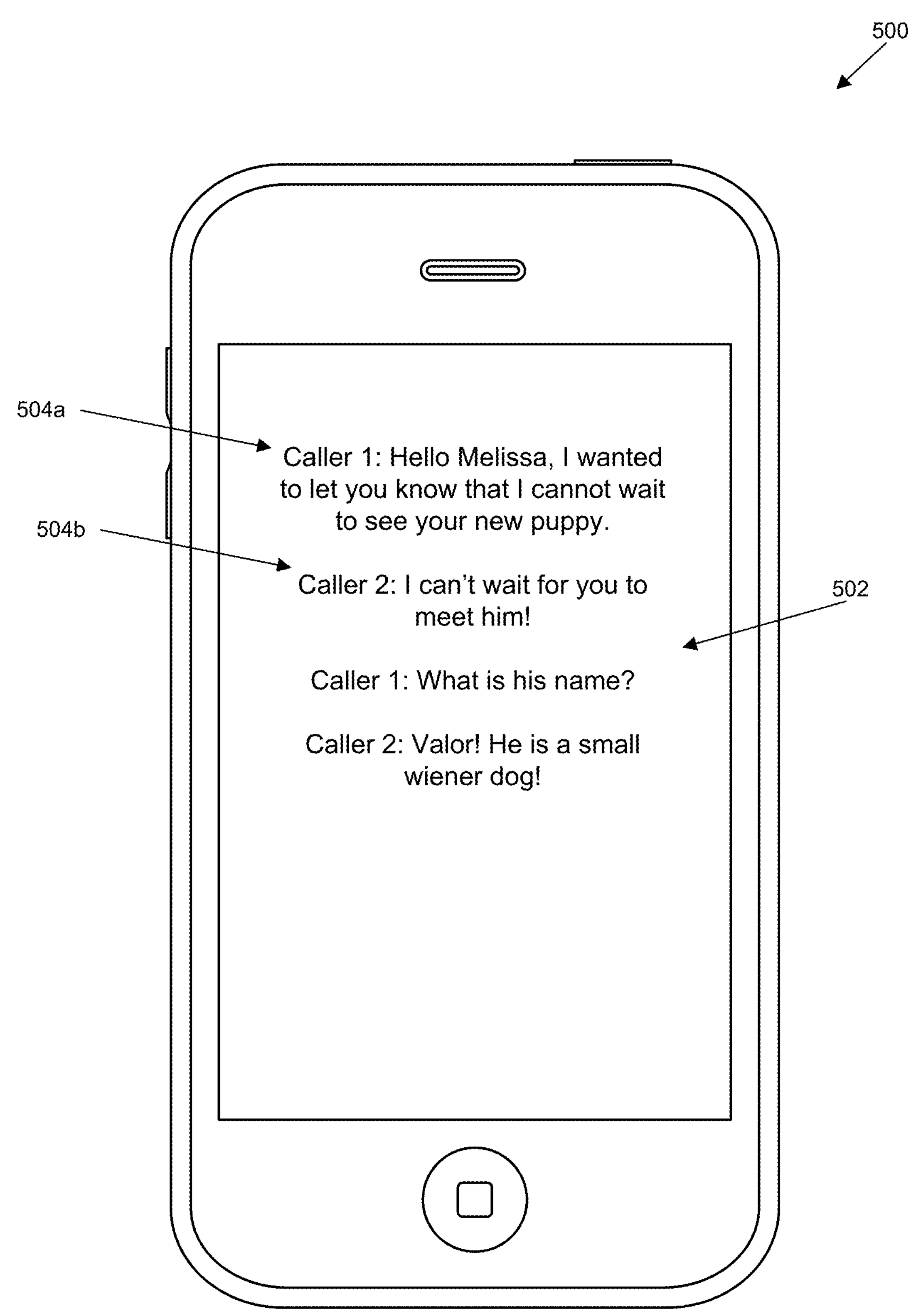
FIG. 5 is a block diagram that illustrates an exemplary user interface, in accordance with one or more implementations of the present technology.

Referring to FIG. 5, which shows a block diagram that illustrates an exemplary user interface, in accordance with one or more implementations of the present technology, a user interface 500 can be provided to one or more users of the two or more user devices. For example, the system may generate for display a visual representation of the transcribed audio data (or portions thereof). For example, the transcribed audio data 502 of the communication session may include portions 504 of the communication session. For instance, where the communication session is between two user devices, the user interface 500 may include a visual representation of first portion 504*a* of a first participant's speech and may also include a visual representation of second portion 504*b* of a second participant's speech. Such user interface 500 may be provided to each participant's user devices or only one of the participant's user devices, in accordance with some implementations of the present technology. The portions 504 may be received on a "rolling basis." For example, as the integrated-network component transcribes a portion of the communication session, the system may provide the corresponding portion(s) to the user device(s) to display such transcribed audio data on the user device(s) via user interface(s) 500.

In some implementations, the system can transmit the transcribed audio data to a different user device. For example, the system may detect (e.g., via one or more wired or wireless networks), whether another device is in proximity of the user device involved in the communication session. Upon the system detecting another device within proximity of the user devices involved in the communication session, the system may cause the user device to transmit the transcribed audio data to the different user device. For instance, where a user is speaking on the phone with a friend and has a television nearby, the system may automatically (or based on a manual indication by the user) transmit the transcribed audio data to the television. In yet other implementations, the system may detect that a screen size of the user device involved in the communication session does not satisfy a threshold screen size (e.g., fails to meet or exceed a minimum screen size). If the system detects that the screen size of the user device involved in the communication session does not satisfy the threshold screen size, the system may generate, for display, the visual representation of the transcribed audio data to another device (e.g., a television) that satisfies the threshold screen size. In this way, the system may improve the user experience as the user may transmit the transcribed audio data to other devices where screen size of the user device involved in the communication session is limited.

In some implementations, the system can summarize the transcribed audio data. For example, to not only reduce utilization of telecommunications network bandwidth but also to reduce the amount of computational resources required to generate visual representations of transcribed audio at a user device, the system may generate a summary of the transcribed audio data to be generated for display on user devices.

For instance, the system can generate a summary of the transcribed audio data by providing the transcribed audio data to an artificial intelligence model that is configured to summarize transcriptions. The artificial intelligence model can be part of the integrated-network component to increase telecommunications transcription security by having the artificial intelligence model as an "in-network" component. For example, as opposed to providing sensitive audio transcripts to a third-party artificial intelligence model that may be vulnerable to a data breach, the system processes the audio transcripts in network (e.g., internally), thereby preserving data integrity and reducing the risk of exposing sensitive user information/communications.

The system can use the summarized transcription of the transcribed audio data to be displayed on one or more of the user devices. For example, as opposed to using a RTT protocol, the system may provide a summarized version of an audio transcript to the user device to reduce the amount of computational resources required to generate the visual representation.

Figure 6:
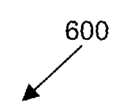
FIG. 6 is a block diagram of an artificial intelligence model, in accordance with some implementations of the present technology.
Figure 6:
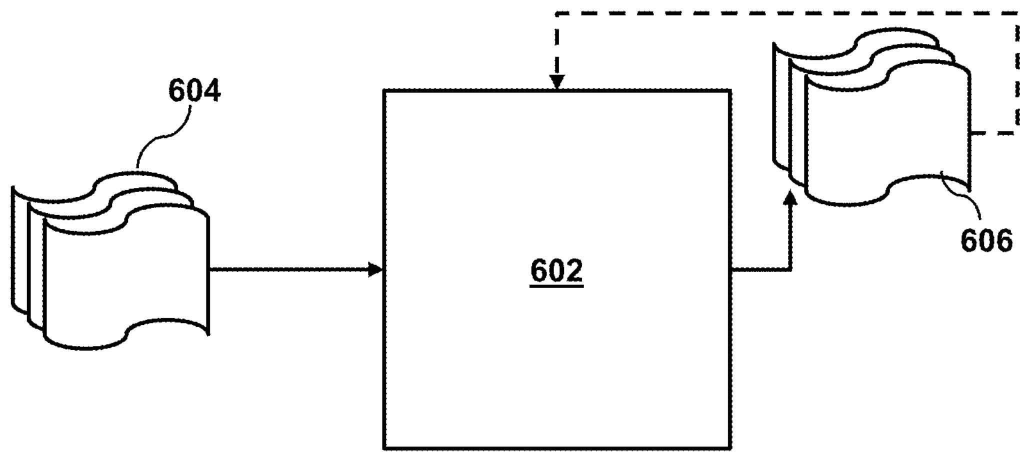

As an example, referring to FIG. 6, which shows a block diagram of an artificial intelligence model, in accordance with some implementations of the present technology, the system may use model 602 to generate a summary of transcribed communication data. For example, block diagram 600 shows a model 602 that can take inputs 604 and provide outputs 606. The inputs may include multiple datasets, such as a training dataset and a test dataset. Each of the plurality of datasets (e.g., inputs 604) may include data subsets related to user data, predicted forecasts and/or errors, and/or actual forecasts and/or errors. In some embodiments, outputs 606 may be fed back to model 602 as input to train model 602 (e.g., alone or in conjunction with user indications of the accuracy of outputs 606, labels associated with the inputs, or other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., a summary of the transcribed communication data).

In a variety of implementations, model 602 may update its configurations (e.g., weights, biases, or other parameters) based on the assessment of its prediction (e.g., outputs 606) and reference feedback information (e.g., user indication of accuracy, reference labels, or other information). In a variety of implementations, where model 602 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 602 may be trained to generate better predictions.

In some implementations, model 602 may include an artificial neural network. In such implementations, model 602 may include an input layer and one or more hidden layers. Each neural unit of model 602 may be connected with many other neural units of model 602. Such connections can be enforcing or inhibitory in their effect on the activation state of connected neural units. In some implementations, each individual neural unit may have a summation function that combines the values of all of its inputs. In some implementations, each connection (or the neural unit itself) may have a threshold function such that the signal must surpass it before it propagates to other neural units. Model 602 may be self-learning and trained, rather than explicitly programmed, and can perform significantly better in certain areas of problem solving as compared to traditional computer programs. During training, an output layer of model 602 may correspond to a classification of model 602, and an input known to correspond to that classification may be input into an input layer of model 602 during training. During testing, an input without a known classification may be input into the input layer, and a determined classification may be output.

In some implementations, model 602 may include multiple layers (e.g., where a signal path traverses from front layers to back layers). In some implementations, backpropagation techniques may be utilized by model 602 where forward stimulation is used to reset weights on the "front" neural units. In some implementations, stimulation and inhibition for model 602 may be more free-flowing, with connections interacting in a more chaotic and complex fashion. During testing, an output layer of model 602 may indicate whether or not a given input corresponds to a classification of model 602 (e.g., a response to a user provided query).

In some implementations, the model (e.g., model 602) may automatically perform actions based on outputs 606. In some implementations, the model (e.g., model 602) may not perform any actions. The output of the model (e.g., model 602) may indicate or otherwise be used to generate a summary of communication session data, or provide other information, in accordance with one or more implementations of the present technology.

In some implementations, the model (e.g., model 602) can be trained based on training information. Model 602 can take a first set of training information in as input 604 (e.g., transcribed communication data with corresponding summaries of the transcribed communication data) and generate an output (e.g., a summary of transcribed communication data) as output 606. For example, model 602 may learn associations between the first set of training information to generate a summary as output 606. The output 606 may be a summarized version of the transcribed communication data (e.g., a summary of the transcribed audio data, etc.). In some embodiments, outputs 606 may be fed back into the model 602 to update one or more configurations (e.g., weights, biases, or other parameters) based on its assessment of its prediction (e.g., outputs 606) and reference feedback information (e.g., user indication of accuracy, reference labels, ground truth information, known recommendations, etc.). The first set of training information may be historical training information that has been used to train prior artificial intelligence/machine learning models to generate a given intended result. In this way, model 602 may be trained to generate one or more summarized versions of transcribed communication data, thereby enabling a reduction in the utilization of network resources (e.g., telecommunications bandwidth) when transmitting a visual representation of the transcribed communication session data.

Computer System

Figure 7:
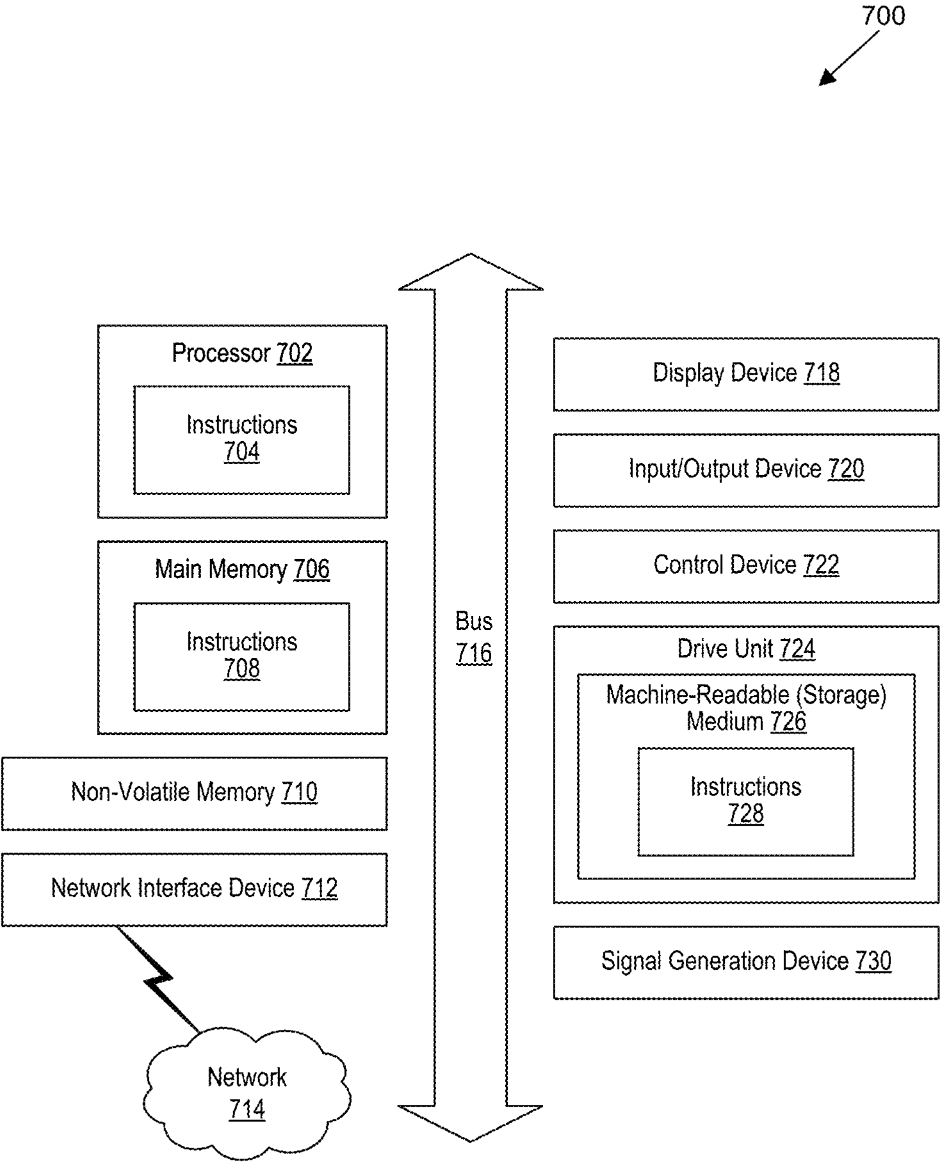
FIG. 7 is a block diagram that illustrates an example of a computer system in which at least some operations described herein can be implemented.

FIG. 7 is a block diagram that illustrates an example of a computer system 700 in which at least some operations described herein can be implemented. As shown, the computer system 700 can include: one or more processors 702, main memory 706, non-volatile memory 710, a network interface device 712, a video display device 718, an input/output device 720, a control device 722 (e.g., keyboard and pointing device), a drive unit 724 that includes a machine-readable (storage) medium 726, and a signal generation device 730 that are communicatively connected to a bus 716. The bus 716 represents one or more physical buses and/or point-to-point connections that are connected by appropriate bridges, adapters, or controllers. Various common components (e.g., cache memory) are omitted from FIG. 6 for brevity. Instead, the computer system 700 is intended to illustrate a hardware device on which components illustrated or described relative to the examples of the figures and any other components described in this specification can be implemented.

The computer system 700 can take any suitable physical form. For example, the computer system 700 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 700. In some implementations, the computer system 700 can be an embedded computer system, a system-on-chip (SOC), a single-board computer (SBC) system, or a distributed system such as a mesh of computer systems, or it can include one or more cloud components in one or more networks. Where appropriate, one or more computer systems 700 can perform operations in real time, in near real time, or in batch mode.

The network interface device 712 enables the computer system 700 to mediate data in a network 714 with an entity that is external to the computer system 700 through any communication protocol supported by the computer system 700 and the external entity. Examples of the network interface device 712 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 706, non-volatile memory 710, machine-readable (storage) medium 726) can be local, remote, or distributed. Although shown as a single medium, the machine-readable (storage) medium 726 can include multiple media (e.g., a centralized/distributed database and/or associated caches and servers) that store one or more sets of instructions 728. The machine-readable (storage) medium 726 can include any medium that is capable of storing, encoding, or carrying a set of instructions for execution by the computer system 700. The machine-readable (storage) medium 726 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 710, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 704, 708, 728) set at various times in various memory and storage devices in computing device(s). When read and executed by the processor 702, the instruction(s) cause the computer system 700 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. A system for improving transcription security by providing transcriptions via integrated telecommunications network components, the system comprising:

at least one hardware processor; and at least one non-transitory memory storing instructions, which, when executed by the at least one hardware processor, cause the system to:

detect a communication session via a telecommunications network between a first mobile device and second mobile device;

access a database storing service data of at least one of the first mobile device or the second mobile device using a mobile device identifier of the first mobile device or the second mobile device to determine whether either the first mobile device or the second mobile device is associated with an option to transcribe audio data of the communication session;

detect, during the communication session, whether a quality criterion of the communication session satisfies a threshold quality criterion;

responsive to detecting that the quality criterion of the communication session fails to satisfy the threshold quality criterion, determine that at least one of the first mobile device or the second mobile device is associated with the option to transcribe the audio data of the communication session;

responsive to determining that at least one of the first mobile device or the second mobile device is associated with the option to transcribe the audio data of the communication session, provide the audio data of the communication session to a telecommunications node comprising an integrated-network component configured to transcribe the audio data of the communication session;

transcribe the audio data of the communication session at the telecommunications node using the integrated-network component; and transmit a textual representation of the audio data of the communication session to each of (i) the first mobile device and (ii) the second mobile device using the transcribed audio data, wherein the textual representation is capable of being displayed on a graphical user interface (GUI).

2. The system of claim 1, wherein the integrated-network component is part of the telecommunications network that is associated with at least one of the first mobile device or the second mobile device.

3. The system of claim 1, further comprising the instructions to:

generate a summary of the transcribed audio data by providing the transcribed audio data to an artificial intelligence model configured to summarize transcriptions; and generate the textual representation of the audio data, wherein the generated textual representation of the audio data is a representation of the generated summary of the transcribed audio data.

4. The system of claim 1, wherein the textual representation of the audio data is generated via a Real-Time-Text (RTT) interface.

5. A method for improving telecommunications transcription security by providing transcriptions via integrated telecommunications network components, the method comprising:

detecting a communication session via a telecommunications network between two or more user devices;

determining whether at least one of the two or more user devices is associated with an option to transcribe audio data of the communication session, the determining comprising:

extracting a user device identifier associated with each of the two or more user devices from a received session-initiated-protocol (SIP) message;

accessing a database storing service data of at least one of the two or more user devices using the extracted user device identifiers of the two or more user devices to determine whether any of the two or more user devices is associated with an option indicating to transcribe the audio data of the communication session; and responsive to determining that any of the two or more user devices is associated with an option to transcribe the audio data of the communication session, determining that at least one of the two or more user devices is associated with the option to transcribe the audio data of the communication;

responsive to determining that at least one of the two or more user devices is associated with the option to transcribe the audio data of the communication session, providing the audio data of the communication session to a telecommunications node comprising an integrated-network component configured to transcribe the audio data of the communication session; and generating, for display, on a graphical user interface (GUI), a visual representation of the transcribed audio data of the communication session at the at least one of the two or more user devices.

6. The method of claim 5, wherein the integrated-network component is part of a telecommunications network that is associated with at least one of the two or more user devices.

7. The method of claim 5, wherein determining whether at least one of the two or more user devices is associated with an option to transcribe the audio data further comprises:

accessing a database storing service data of at least one of the two or more user devices using user device identifiers of the two or more user devices to determine whether at least one of the two or more user devices is associated with the option to transcribe audio data of the communication session.

8. The method of claim 5, wherein determining whether at least one of the two or more user devices is associated with an option to transcribe the audio data further comprises:

parsing a session-initiated-protocol (SIP) message received by one or more of the two or more user devices to determine whether the SIP message comprises a user-selected option indicating to transcribe the audio data of the communication session; and responsive to determining that the SIP message comprises the user-selected option indicating to transcribe the audio data of the communication session, determining that at least one of the two or more user devices is associated with the option to transcribe the audio data of the communication session.

9. The method of claim 5, wherein determining whether at least one of the two or more user devices is associated with an option to transcribe the audio data further comprises:

processing, during the communication session, the audio data of the communication session to determine whether at least one user of two or more users associated with the two or more user devices verbally indicates to transcribe the audio data of the communication session; and responsive to determining that at least one user of the two or more users verbally indicates to transcribe the audio data of the communication session, determining that at least one of the two or more user devices is associated with the option to transcribe the audio data of the communication session.

10. The method of claim 5, wherein determining whether at least one of the two or more user devices is associated with an option to transcribe the audio data further comprises:

detecting, during the communication session, whether a quality criterion of the communication session satisfies a threshold quality criterion; and responsive to detecting that the quality criterion of the communication session fails to satisfy the threshold quality criterion, determining that at least one of the two or more user devices is associated with the option to transcribe the audio data of the communication session.

11. A method for improving telecommunications transcription security by providing transcriptions via integrated telecommunications network components, the method comprising:

detecting a communication session via a telecommunications network between two or more user devices;

determining whether at least one of the two or more user devices is associated with an option to transcribe audio data further comprising:

detecting whether any of the two or more user devices is communicating via a satellite network during the communication session; and responsive to detecting whether any of the two or more user devices is communicating via the satellite network during the communication session, determining that at least one of the two or more user devices is associated with the option to transcribe the audio data of the communication session;

responsive to determining that at least one of the two or more user devices is associated with the option to transcribe the audio data of the communication session, providing the audio data of the communication session to a telecommunications node comprising an integrated-network component configured to transcribe the audio data of the communication session; and generating, for display, on a graphical user interface (GUI), a visual representation of the transcribed audio data of the communication session at the at least one of the two or more user devices.

12. The method of claim 5, wherein determining whether at least one of the two or more user devices is associated with an option to transcribe the audio data further comprises:

extracting a user device identifier associated with each of the two or more user devices from a received session-initiated-protocol (SIP) message;

determining whether at least one of the extracted user device identifiers is associated with an emergency service provider; and responsive to determining that at least one of the extracted user device identifiers is associated with the emergency service provider, determining that at least one of the two or more user devices is associated with the option to transcribe the audio data of the communication session.

13. The method of claim 5, wherein generating the visual representation of the transcribed audio data further comprises:

generating a summary of the transcribed audio data by providing the transcribed audio data to an artificial intelligence model configured to summarize transcriptions; and generating, for display, on the GUI, the visual representation of the transcribed audio data, wherein the visual representation of the transcribed audio data is a visual representation of the generated summary of the transcribed audio data.

14. At least one non-transitory, computer-readable storage medium storing instructions, which, when executed by at least one data processor of a system, cause the system to:

detect a communication session via a telecommunications network between two or more user devices, wherein data of the communication session comprises audio data;

determine whether at least one of the two or more user devices is associated with an option to transcribe the data of the communication session;

responsive to determining that at least one of the two or more user devices is associated with the option to transcribe the data of the communication session, providing the data of the communication session to a telecommunications node comprising an integrated-network component configured to transcribe the data of the communication session; and generate, for display, on a graphical user interface (GUI), a visual representation of the transcribed data of the communication session at the at least one of the two or more user devices;

detect, via the integrated-network component, that at least one portion of the data of the communication session is in a first language;

determine that at least one of the two or more user devices is associated with an option to transcribe the data of the communication session into a second language; and transcribe the at least one portion of the data of the communication session in the first language into the second language via the integrated-network component wherein the transcribed at least one portion of the data of the communication session in the first language into the second language is transmitted to at least one of the two or more user devices.

15. The non-transitory, computer-readable storage medium of claim 14, wherein determining whether at least one of the two or more user devices is associated with an option to transcribe the data of the communication session further comprises:

access a database storing service data of at least one of the two or more user devices using user device identifiers of the two or more user devices to determine whether at least one of the two or more user devices is associated with the option to transcribe data of the communication session.

16. The non-transitory, computer-readable storage medium of claim 14, wherein determining whether at least one of the two or more user devices is associated with an option to transcribe the data of the communication session further comprises:

parse a session-initiated-protocol (SIP) message received by one or more of the two or more user devices to determine whether the SIP message comprises a user-selected option indicating to transcribe the data of the communication session; and responsive to determining that the SIP message comprises the user-selected option indicating to transcribe the audio data of the communication session, determine that at least one of the two or more user devices is associated with the option to transcribe the data of the communication session.

17. The non-transitory, computer-readable storage medium of claim 14, wherein determining whether at least one of the two or more user devices is associated with an option to transcribe the data of the communication session further comprises:

detect whether any of the two or more user devices is communicating via a satellite network during the communication session; and responsive to detecting whether any of the two or more user devices is communicating via the satellite network during the communication session, determine that at least one of the two or more user devices is associated with the option to transcribe the data of the communication session.

18. The non-transitory, computer-readable storage medium of claim 14, wherein generating the visual representation of the transcribed data further comprises:

generate a summary of the transcribed data of the communication session by providing the transcribed data to an artificial intelligence model configured to summarize transcriptions; and generate, for display, on the GUI, the visual representation of the transcribed data of the communication session, wherein the visual representation of the transcribed data is a visual representation of the generated summary of the transcribed data.

* * * * *